(12) United States Patent
Abrahamson et al.

(10) Patent No.: US 11,276,847 B2
(45) Date of Patent: *Mar. 15, 2022

(54) METHOD AND MACHINE FOR MANUFACTURING A FIBRE ELECTRODE

(71) Applicant: ARCACTIVE LIMITED, Christchurch (NZ)

(72) Inventors: John Abrahamson, Christchurch (NZ); Shane Christie, Christchurch (NZ); Hannu Out, Christchurch (NZ); Euan Scott Heffer, Christchurch (NZ); Yoon San Wong, Christchurch (NZ)

(73) Assignee: ArcActive Limited, Christchurch (NZ)

( * ) Notice: Subject to any disclaimer, the term of this patent is extended or adjusted under 35 U.S.C. 154(b) by 59 days.

This patent is subject to a terminal disclaimer.

(21) Appl. No.: 16/596,115

(22) Filed: Oct. 8, 2019

(65) Prior Publication Data

US 2020/0035987 A1 Jan. 30, 2020

Related U.S. Application Data

(63) Continuation of application No. 15/534,767, filed as application No. PCT/IB2015/059529 on Dec. 11, 2015, now Pat. No. 10,476,069.

(30) Foreign Application Priority Data

Dec. 11, 2014 (NZ) ........................................ 702951
May 15, 2015 (NZ) ........................................ 708185

(51) Int. Cl.

| | | |
|---|---|---|
| *B22D 19/14* | (2006.01) | |
| *C23C 6/00* | (2006.01) | |
| *H01M 4/04* | (2006.01) | |
| *H01M 4/16* | (2006.01) | |
| *C22C 1/04* | (2006.01) | |
| *C22C 11/00* | (2006.01) | |
| *C22C 11/06* | (2006.01) | |
| *H01M 4/38* | (2006.01) | |
| *H01M 50/541* | (2021.01) | |
| *C22C 49/02* | (2006.01) | |
| *C22C 49/12* | (2006.01) | |
| *C22C 49/14* | (2006.01) | |

(52) U.S. Cl.
CPC .......... *H01M 4/0416* (2013.01); *B22D 19/14* (2013.01); *C22C 1/045* (2013.01); *C22C 11/00* (2013.01); *C22C 11/06* (2013.01); *C23C 6/00* (2013.01); *H01M 4/16* (2013.01); *H01M 4/38* (2013.01); *H01M 50/541* (2021.01); *C22C 49/02* (2013.01); *C22C 49/12* (2013.01); *C22C 49/14* (2013.01)

(58) Field of Classification Search
None
See application file for complete search history.

(56) References Cited

U.S. PATENT DOCUMENTS

| | | | |
|---|---|---|---|
| 3,095,642 A | | 7/1963 | Lockwood |
| 3,907,594 A | * | 9/1975 | Jonville .................. H01M 4/74 205/63 |
| 3,926,674 A | * | 12/1975 | Jonville .................. H01M 4/16 264/104 |
| 4,865,933 A | | 9/1989 | Blanyer et al. |
| 5,348,817 A | | 9/1994 | Rao et al. |
| 2002/0040680 A1 | | 4/2002 | Negishi et al. |
| 2011/0311876 A1 | | 12/2011 | Sturgeon et al. |
| 2012/0021281 A1 | | 1/2012 | Kelley et al. |

FOREIGN PATENT DOCUMENTS

| | | | |
|---|---|---|---|
| EP | 1143028 A1 | 10/2001 | |
| JP | 48101524 | 4/1972 | |
| JP | 61088944 A | 5/1986 | |
| JP | 4014760 | 1/1992 | |
| JP | 7-314122 A | 12/1995 | |
| JP | 07314122 A * | 12/1995 | |
| WO | 2010098796 A1 | 9/2010 | |
| WO | 2011078707 A1 | 6/2011 | |
| WO | 2013133724 A2 | 9/2013 | |
| WO | WO-2013133724 A2 * | 9/2013 | .............. H01M 4/20 |
| WO | 2014046556 A1 | 3/2014 | |

* cited by examiner

*Primary Examiner* — Jose I Hernandez-Kenney
(74) *Attorney, Agent, or Firm* — Dann, Dorfman, Herrell and Skillman, P.C.

(57) ABSTRACT

A method for forming a connection such as an electrical connection, to a fibre material electrode element comprises moving a length of the fibre material relative to a pressure injection stage and pressure impregnating by a series of pressure injection pulses a lug material into a lug zone part of the fibre material to surround and/or penetrate fibres of the fibre material and form a lug strip in the lug zone. The fibre material may be a carbon fibre material and the lug material a metal such as Pb or a Pb alloy. Apparatus for forming an electrical connection to a fibre material electrode element is also disclosed.

12 Claims, 14 Drawing Sheets

METHOD AND MACHINE FOR MANUFACTURING A FIBRE ELECTRODE

This application is a continuation of U.S. application Ser. No. 15/534,767, which was the National Stage of International Application PCT/IB2015/059259, filed on Dec. 11, 2015, the entireties of which are incorporated herein by reference.

FIELD OF THE INVENTION

The invention relates to an improved method and machine for forming a connection, particularly an electrical connection, to a fibre material, particularly a fibre material, for use in general as an electrode material, such as for a battery or cell fibre electrode, and to a material so formed, particularly an electrode so formed.

BACKGROUND

In a lead-acid battery or cell comprising a fibre particularly carbon fibre electrode or electrodes, typically a very low electrical resistance and mechanically durable connection is required between the conductive fibre electrode material and a connector or lug (herein generally referred to as lug) to the external circuit.

Our PCT international patent application discloses a method for forming a lug on an electrically conductive fibre material electrode element which comprises pressure impregnating lug material typically in a die, to surround and/or penetrate fibres of the fibre material.

To enable fast high volume manufacture of multiple electrodes some form of continuous lug forming process is required.

SUMMARY OF INVENTION

In broad terms in one aspect the invention comprises a method for forming a connection to a fibre material electrode element, which comprises moving a length of the fibre material relative to a pressure injection stage or vice versa and by the pressure injection stage pressure impregnating by a series of pressure injection pulses a lug material into a lug zone part of the fibre material to surround and/or penetrate fibres of the fibre material and form a lug strip in the lug zone.

In broad terms in another aspect the invention comprises a method for forming an electrical connection to an electrically fibre material electrode element, which comprises moving a length of the fibre material relative to a pressure injection stage or vice versa and by the pressure injection stage pressure impregnating by a series of pressure injection pulses an lug material into a lug zone part of the fibre material to surround and/or penetrate fibres of the fibre material and form a lug strip in the lug zone, electrically connected to the fibre material.

In broad terms in another aspect the invention comprises a method for forming an electrical connection to an electrically conductive fibre material electrode element, which comprises moving a length of the conductive fibre material relative to a pressure injection stage or vice versa and by the pressure injection stage pressure impregnating by a series of pressure injection pulses an electrically conductive lug material into a lug zone part of the fibre material to surround and/or penetrate fibres of the fibre material and form a lug strip in the lug zone, electrically connected to the fibre material.

In at least some embodiments the pressure impregnating comprises pressure impregnating without containing the lug zone part of the fibre material in a die (sealed or not)

In broad terms in another aspect the invention comprises a method for forming an electrical connection to a fibre material electrode element, which comprises moving a length of the fibre material relative to a pressure injection stage or vice versa and by the pressure injection stage pressure impregnating without containing the lug zone part of the fibre material in a die a lug material into a lug zone part of the fibre material to surround and/or penetrate fibres of the fibre material and form a lug strip in the lug zone, electrically connected to the fibre material.

In broad terms in another aspect the invention comprises a method for forming a connection to a fibre material electrode element, which comprises moving a length of the fibre material relative to a pressure injection stage that applies continuous pressure to the electrode element or vice versa and by the pressure injection stage continuously impregnating a material into the lug zone part of the fibre material to surround and/or penetrate fibres of the fibre material and form a lug strip in the lug zone, connected to the fibre material.

In broad terms in another aspect the invention comprises a method for forming an electrical connection to an fibre material electrode element, which comprises moving a length of the fibre material relative to a pressure injection stage that applies continuous pressure to the electrode element or vice versa and by the pressure injection stage continuously impregnating an lug material into the lug zone part of the fibre material to surround and/or penetrate fibres of the fibre material and form a lug strip in the lug zone, electrically connected to the fibre material.

Typically the method comprises moving the fibre material continuously or in a stepped movement, and by the pressure injection stage pressure impregnating lug material into the lug zone part of the fibre material by the series of pressure injection pulses during the relative movement between the fibre material and pressure injection stage so that multiple pressure injection pulses inject lug material into different adjacent portions of the fibre material but forming a continuous lug along the lug zone.

The method of the invention may require that the series of pressure injection pulses are a controlled series of pressure injection pulses.

The method of the invention may be carried out without containing the lug zone part of the fibre material in a die.

The length of the fibre material can be subsequently cut across the lug strip to form multiple individual electrode elements each with a lug for external connection of the electrode element.

In at least some embodiments the continuous lug has a width along the plane of the material in the range about 1 mm to about 200 mm and the pressure impregnating comprises delivering the lug material into the fibre material from an orifice of an area in the range about 0.1 to about 10 mm$^2$.

In at least some embodiments:
  the pressure impregnation comprises delivering the lug material into the fibre material from an orifice in contact with a surface of the fibre material or spaced not more than 2 mm from the surface of the fibre material, and/or
  a duration of each pressure injection pulse is in the range about 0.1 to about 2 seconds, and/or
  the rate of relative movement between the fibre material and pressure injection stage is in the range about 0.01 m/s to 10 m/s, and/or the volume of each pressure injection pulse delivered by each individual orifice is <1 cm3, and/or a temperature differential exists between the lug material at injection and the fibre material eg. the temperature at injection is between about 300° C. to about 500° C. and the temperature of the fibre material is less than 300° C., and/or the frequency of pressure pulses is at least 1 Hz, and/or the lug material when delivered by the series of pressure pulses comprises a contiguous strip of lug material that may be electrically and/or mechanically connected, and/or the series of pressure pulses can be delivered at a rate in the range of 1 pulse/0.1 m to about 200 pulses/0.1 m.

In at least some embodiments the pressure of each pressure injection pulse is higher at or towards an end of the pulse than at or towards a start of each pulse.

In broad terms in another aspect the invention comprises a fibre material having a length of at least 1 metre with a lug strip along a length of the fibre material and having a width less than a width of the fibre material, comprising a continuous impregnation of a lug material into the fibre material surrounding and/or penetrating and electrically connecting to the fibres of the fibre material.

The fibre material may have a length of at least 10 metres.

The lug strip may be formed at or near a length-wise edge of the fibre material and comprising a lug extension beyond an edge of the fibre material.

Typically the fibre material is a non-metallic material such as a carbon fibre material, such as a non-woven such as fluid-entangled carbon fibre material, felted carbon fibre material, or a knitted or a woven carbon fibre material. The material has an average interfibre spacing less than about 250 microns and in some embodiments less than about 200, less than about 100 microns, less than about 50 microns, less than about 20 microns, or less than about 10 microns.

In some embodiments the impregnating material impregnates between at least about 30%, at least about 40%, at least about 50%, at least about 70%, at least about 80%, or at least about 90%, or at least about 95%, or at least about 98%, or at least about 99% of the fibres.

In all embodiments above the fibre material may be a non-woven material such as a felt material, a woven material (comprising intersecting warp and weft fibres), or a knitted material. The material may be a carbon fibre material, such as a non-woven, knitted, or woven carbon fibre fabric, or alternatively a glass fibre or silicon based fibrous material. The fibres, for example, carbon fibres are typically multi-filamentary but may be monofilament. In some embodiments the fibre material has an average interfibre spacing of less than about 250 microns, or less than about 200 microns, less than about 100 microns, less than about 50 microns, less than about 20 microns, or less than about 10 microns. The fibre diameter may be in the range from about 1 micron to about 30 microns, from about 4 microns to about 20 micron, from about 5 microns to about 15 microns. The voidage in the (unimpregnated) material may be at least about 50%, or at least about 60%, or at least about 70%, or at least about 80% or at least about 95%, or at least about 98%, or at least about 99% for example.

In some embodiments the impregnating lug material is a metal. In one embodiment the metal is Pb or a Pb alloy (herein both referred to inclusively as Pb). In another embodiment the metal is a Zn or a Zn alloy (herein both referred to inclusively as Zn). In another embodiment the metal is Cd or a Cd alloy (herein both referred to inclusively as Cd). In another embodiment the metal is Al or a Al alloy (herein both referred to inclusively as Al). Alternatively the impregnating lug material may be a polymer material such as a conductive polymer for example.

In some embodiments the fibre material may be carbon fibre material which has been treated by electric arc discharge. The carbon fibre material may be electric arc treated by moving the carbon fibre material within a reaction chamber either through an electric arc in a gap between electrodes including multiple adjacent electrodes on one side of the material, or past multiple adjacent electrodes so that an electric arc exists between each of the electrodes and the material. In other embodiments the carbon fibre material for use as the electrode current collector material may be thermally treated at an elevated temperature for example in the range 1200 to 2800° C. Such treatment may increase electrical conductivity of the material.

In a cell or battery, the positive electrode or electrodes, the negative electrode or electrodes, or both, may be formed of one or more layers of the fibre material with a lug, in accordance with the invention. The invention has been described herein sometimes with reference to electrodes of lead-acid (Pb-acid) batteries but may also have application to other battery types such as Li-ion batteries, and in other applications such as in electrodes in solar cells, or in capacitors or supercapacitors, for example.

In some embodiments the invention comprises a hybrid automotive vehicle comprising a Pb-acid battery of the invention and/or made in accordance with the methods taught herein. In other embodiments the hybrid automotive vehicle has stop-start and/or regenerative braking functionality. In other embodiments the battery can carry accessory loads when the vehicle engine is off.

A benefit of the manufacturing method and product of the invention is that the continuous fibre material which is subsequently cut to individual electrodes, has formed thereon a continuous lug strip rather than a series of individual separated lug segments. This continuous lug strip acts to strengthen continuous fibre material during subsequent manufacturing steps and handling, such as pasting with active material, carried out before the continuous fibre material is then cut into individual separated electrodes. The presence of the continuous lug along the continuous fibre material rather than a series of individual separated lug segments may also make it easier to feed the continuous fibre material through subsequent manufacturing steps.

In broad terms in a further aspect the invention comprises apparatus for forming an electrical connection to a fibre material electrode element, arranged to move a length of the fibre material relative to a pressure injection stage or vice versa and by the pressure injection stage pressure impregnating by a series of pressure injection pulses a lug material into a lug zone part of the fibre material to surround and/or penetrate fibres of the fibre material and form a lug strip in the lug zone.

In broad terms in a further aspect the invention comprises apparatus for forming an electrical connection to an electrically conductive fibre material electrode element, arranged to move a length of the conductive fibre material relative to a pressure injection stage or vice versa and by the pressure injection stage pressure impregnating by a series of pressure injection pulses an electrically conductive lug material into a lug zone part of the fibre material to surround and/or penetrate fibres of the fibre material and form a lug strip in the lug zone, electrically connected to the fibre material.

In board terms in a further aspect the invention comprises apparatus for forming an electrical connection to a fibre material electrode element, arranged to move a length of the fibre material relative to a pressure injection stage or vice versa and by the pressure injection stage pressure impregnate by a series of pressure injection pulses a lug material into a lug zone part of the fibre material to surround and/or penetrate fibres of the fibre material and form a lug strip in the lug zone, electrically connected to the fibre material.

In some embodiments the apparatus is arranged to form the lug strip at or near a length-wise edge of the fibre material. In some embodiments the apparatus is arranged to form the lug strip transversely across the fibre material. In some embodiments the lug strip further includes a lug extension or extensions beyond the edge of the fibre material. In some embodiments the lug extension(s) may be cut out of the lug strip for example by stamping.

In some embodiments the apparatus is arranged to move the fibre material relative to the pressure injection stage or vice versa by carrying the fibre material on a heat sink conveyor. In some embodiments the heat sink conveyor comprises a rotating drum and the fibre material passes through a nip between the rotating drum and the pressure injection stage.

In this specification 'lug' means any electrically conductive element or connector which enables external connection of the fibre electrode, regardless of physical or mechanical form.

In this specification 'lug region' and 'lug zone' are used interchangeably and have the same meaning and refers to a region of the fibre material which after forming of a lug comprises a matrix of lug material encapsulating the fibre material, and optionally the lug zone may also include an extension of solid lug material continuously or at intervals to a side of this matrix.

In this specification "matrix" in relation to the lug refers to lug material encapsulating the fibre material in the lug zone in a 3-dimensional structure that has length, width and depth.

In this specification "hybrid vehicle" refers to a vehicle that incorporates any one of idle elimination (stop-start functionality), regenerative braking, and any combination of an internal combustion engine with an electric motor where one or the other or both can provide a drive functionality, a hybrid vehicle may also include a vehicle that may only be a partial hybrid vehicle.

More generally the method of the invention may be used for forming an electrical connection to a fibre material which is not an electrode element, or even more generally for impregnating a first material which is not also electrically conductive, into a fibre material not for forming an electrical connection to the fibre material but instead for other industrial purposes, and thus more broadly than described above the invention may be said to include a method for forming an integral area of a first material in and through a thickness of a second, fibre material, which comprises moving a length of the fibre material relative to a pressure injection stage or vice versa and by the pressure injection stage pressure impregnating by a series of pressure injection pulses the first material into a part of the area of the fibre material to surround and/or penetrate fibres of the fibre material and to form an area of the impregnated material in the fibre material.

In broad terms in a further aspect the invention comprises a method for forming an integral area a first material in and through a thickness of a larger area of a second, fibre material, which comprises moving a length of the fibre material relative to a pressure injection stage or vice versa and by the pressure injection stage pressure impregnating (without containing the fibre material in a die) the first material into a part of the area of the fibre material to surround and/or penetrate fibres of the fibre material and to form an area strip of the impregnated material in the fibre material.

Additionally the method of the invention may be used to increase the tensile strength of the fibre material along the fibre materials length and width making it stronger than it would otherwise be without.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE FIGURES

Embodiments of the invention are further described with reference to the accompanying figures by way of example wherein.

DETAILED DESCRIPTION OF PREFERRED EMBODIMENTS

Lugs

Figure 1:
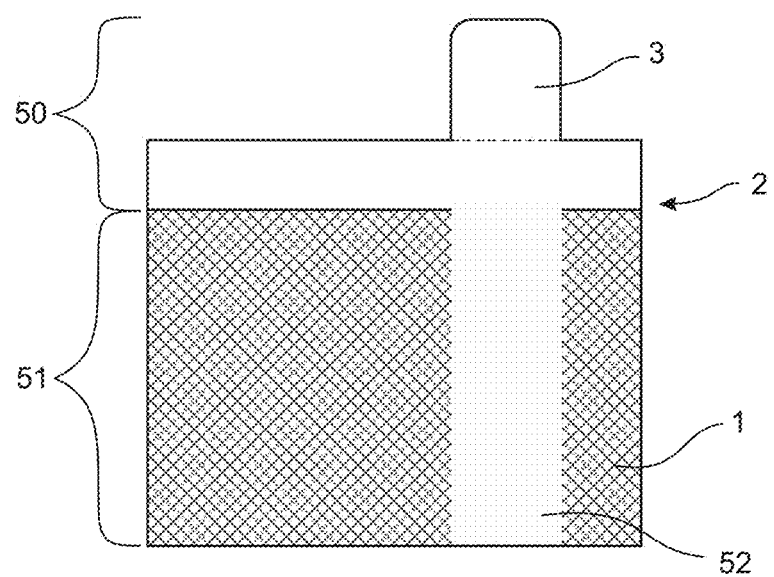
FIG. 1 shows carbon fibre material electrode with a Pb lug formed by a method embodiment of the invention.
Figure 2:
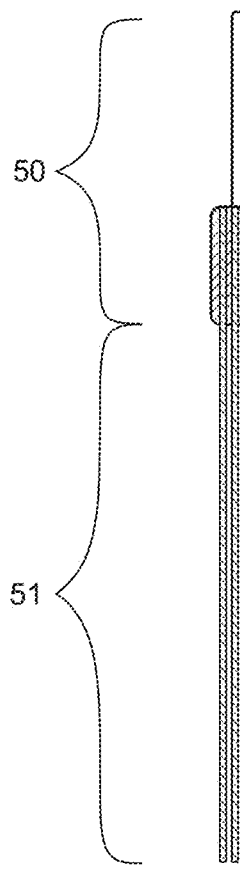
FIG. 2 is schematic cross-section of an electrode comprising multiple layers of carbon fibre material and a lug.
Figure 3:
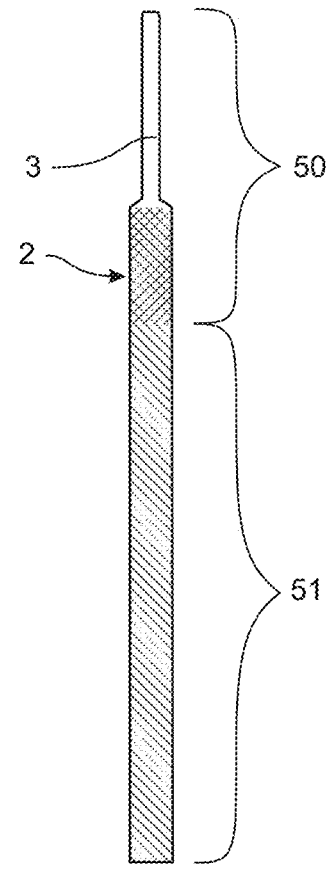
FIG. 3 is schematic cross-section of an electrode similar to that of FIG. 2 but comprising a single layer of carbon fibre material and a lug.

FIG. 1 shows a section of a conductive fibre electrode such as of carbon fibre, for a Pb-acid cell or battery for example, with one form of lug such as a Pb lug, formed on the fibre material by a pressure impregnating embodiment of the invention. The fibre material is indicated at 1 and the lug at 2. The lug may have a similar thickness (dimension through the plane of the material) to the fibre material thickness (single or multiple layers) or a lesser thickness, or may be of greater thickness. FIG. 2 is a schematic cross-section of a similar electrode indicating both a lug zone 50 and electrode zone 51. The electrode in FIG. 2 comprises multiple layers 1 of fibre material, and a lug 2. FIG. 3 is schematic cross-section of an electrode similar to that of FIG. 2 but comprising a single layer of carbon fibre material and a lug. In the embodiments shown the lug has a lug extension 3 beyond the edge of the fibre material, comprising lug material only ie solid lug material such as Pb. The lug is typically formed of metal such as Pb or a Pb alloy, Zn or a Zn alloy, or Cd or a Cd alloy, or Al or a Al alloy, but may alternatively be formed of other lug material such as a conductive polymer for example.

In the embodiment shown the lug extends along a single edge of the electrode, which is a single upper edge, but alternatively the lug may extend along two or more edges of the electrode, the lug may be curved or arcuate (arched) in shape, and/or may be formed to extend across a centre area of an electrode and/or the electrode zone. Additionally a transverse/macro-scale current collector 52 may be provided that is formed in the same way as the lug as will be described, that extends from the lug zone across and to any location within the electrode zone. Preferably the macro scale current collector extends to the edge of the electrode diametrically opposite the lug zone.

In some embodiments substantially all or at least a majority of the fibres of the electrode material extend continuously across the electrode to or through the lug.

The fibre material may be a non-woven such as fluid-entangled, felted, knitted, or woven fibre fabric, in particular a non-woven such as a fluid-entangled, felt, knitted, or woven carbon fibre fabric. Alternatively the material may be a glass fibre or silicon based fibrous material, which may be coated with a conductive material typically metal, such as a Pb film or coating. The fibres, for example carbon fibres, are typically multifilamentary but may be monofilament. In at least some embodiments the fibre material has an average interfibre spacing of less than about 250 microns, less than about 100 microns, less than about 50 microns, less than about 20 microns, or less than about 10 microns. In at least some embodiments the fibre diameter is in the range from about 1 micron to about 30 microns, from about 4 microns to about 20 micron, or from about 5 microns to about 15 microns. The voidage in the (unimpregnated) material may be in the range of from about 50% to at least about 99%, from about 40% to about 99%, or from about 30% to about 98%, or from about 20% to about 98%, or from about 15% to about 98%, or from about 10% to about 95%. This voidage of the unimpregnated material being the space (voidage) not occupied by the fibres of the fibre material.

In some embodiments the impregnating material impregnates between at least about 50%, at least about 60%, at least about 780%, or at least about 80%, or at least about 90, or at least about 95%, or at least about 98% of the voidage fibre material. This voidage of the unimpregnated material, being the space (voidage) not occupied by the fibre material itself or the impregnating material that has impregnated the fibre material, i.e., this is the voidage remaining of the unimpregnated material after it has been impregnated.

In some embodiments the interfibre voidage in the fibre material (being the fraction of the total volume defined by the material outside dimensions not occupied by the fibres—in the unimpregnated material) is reduced by impregnation of the lug material between into the interfibre voidage between the fibres to, at least about 50%, at least about 70%, at least about 80%, at least about 90%, at least about 95%, at least about 98%, or at least about 99% of the original interfibre voidage.

In some embodiments the fibres of the fibre material are multifilament fibres and the impregnating lug material also penetrates between filaments also reducing intrafibre voidage. In some embodiments intrafibre voidage is also reduced to about 40%, to about 30%, to about 25%, to about 20%, to about 10%, to about 5%, or to about 1% of the intrafibre voidage in the unimpregnated fibre material.

A matrix of the lug material encapsulates the microscale carbon fibre electrode material in the lug zone. A very low electrical resistance connection is formed between the microscale carbon fibre electrode material and lug. Also voidage between the lug material and the fibres is minimised, preventing or minimising battery electrolyte from subsequently entering the lug to fibre connection and deteriorating the connection, so the connection is more durable.

Optionally any remaining (open cell/porous) voidage between the lug material and the fibres and/or filaments may be reduced by filling with a material which is substantially inert to the electrolyte, such as for example a non-conductive polymer such as an epoxy.

Optionally the impregnating material (not inert to an electrolyte) is protected from the bulk of the electrolyte by an inert material barrier.

Optionally also the impregnating lug material may be a material which is electrically conductive but substantially inert to a battery electrolyte such as a Pb acid battery electrolyte such as titanium.

The conductive or carbon fibre material may have a thickness (transverse to a length and width or in plane dimensions of the electrode) many times such as about 10, 20, 50, or 100 times less than the or any in plane dimension of the electrode. The thickness may be less than about 5 mm or less than about 3 mm or less than about 2 mm or less than about 1.5 mm or about or less than about 1 mm or about 0.2 mm for example. Each of the in plane length and width dimensions of the electrode may be greater than about 50 or about 100 mm for example. Such electrodes have a planar form with low thickness. In preferred forms the electrode is substantially planar and has a dimension from a metal lug for external connection along at least one edge of the electrode less than about 100 mm or less than about 70 mm, or less than about 50 mm, or about 30 mm or less for example (with or without a transverse/macro-scale current collector). Alternatively such a planar form may be formed into a cylindrical electrode for example.

Continuous Lug Manufacture

In accordance with the invention, to enable fast high volume manufacture of multiple electrodes, continuous fibre material is unwound from a roll of many metres of the material for example, is moved continuously or at least with a stepped movement, past a pressure injection stage, at which the lug material is pressure impregnated into the fibre material by a series of pressure injection pulses. Multiple pressure injection pulses may inject lug material into different adjacent portions of the fibre material but to form a continuous lug along the lug zone. The lug material penetrates into the fibre material preferably from the surface or side from which it is injected to an opposite surface or side. Typically the fibre material is in sheet (planar) form. The method of the invention may be carried out without containing the lug zone part of the fibre material in a die. The length of the fibre material can be subsequently cut across the lug strip to form multiple individual electrode elements each with a lug for external connection of the electrode element. Alternatively the pressure injection stage may be moved along the length of the continuous fibre material. The method of the invention may be carried out by applying continuous pressure injection as the fibre moves past the pressure injection head.

Figure 4:
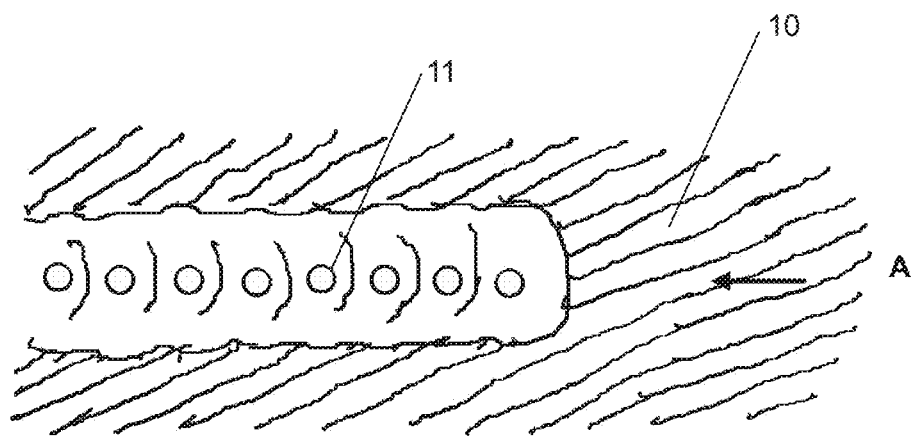
FIG. 4 shows a schematic of a portion of carbon fibre material with a Pb lug strip being formed on it in close up.

FIG. 4 shows in close up a portion of fibre material 10 with a lug strip 11 being formed on it. The fibre material 10 moves during impregnation in the direction of arrow A beneath an injector head while multiple pressure injection pulses inject molten lug material into the fibre material as it moves. For example, the fibre material may move on a conveyor which acts as a heat sink, such as a metal conveyor such as a taut metal band or a rotating drum, while multiple pressure injection pulses inject molten lug material into the fibre material as it moves. The speed at which the material moves beneath the injector head, the volume of molten lug material injected at each injector pulse or shot, the duration and frequency of the injector pulses, the duration between injector pulses, the temperatures of the fibre material, and of the molten lug material, are co-ordinated so that the molten lug material impregnating into the fibre material from each new injector pulse merges while molten with the lug material in the fibre material injected at the prior injector pulse, to form the continuous lug strip 11. This is a controlled process to ensure that not too much lug material is introduced such that it spills beyond the limits of the upper or lower surfaces of the fibre material, or beyond the desired path within the fibre material.

In FIG. 4 the circles along the length of lug strip 11 each schematically indicate lug material injected by sequential injector pulses. The lug material that has been injected by these sequential pulses are each individually electrically and/or mechanically connected and/or linked to provide a continuous lug strip. This strip is largely impervious to the outside environment. To enable this connection between each of the sequential pulses, for example the duration of each pressure injection pulse may be in the range about 0.1 to about 2 seconds, or about 0.1 to 1 second, or about 0.1 to about 80 milliseconds, or about 0.1 to about 50 milliseconds, or about 0.1 to about 30 milliseconds, or about 0.1 to about 10 milliseconds, and for example injector pulses may separated by an interval of about 0.1 to about 2 seconds, or about 0.1 to 1 second, or about 0.1 to about 80 milliseconds, or about 0.1 to about 50 milliseconds, or about 0.1 to about 30 milliseconds, or about 0.1 to about 10 milliseconds, and when the rate of relative movement between the fibre material and pressure injection stage is in the range about 0.01 m/s to 10 m/s, or about 0.01 m/s to 8 m/s, or about 0.01 m/s to 5 m/s. In other embodiments the rate of the pressure pulses is greater than 1 Hz, greater than 5 Hz, greater 10 Hz or greater than 20 Hz. In other embodiments the series of pulses per 0.1 m length of lug zone when moving in the machine direction can be within the range 1 pulse/0.1 m to 200 pulses/0.1 m, or within the range 5 pulses/0.1 m to 150 pulses/0.01 m, or within the range 10 pulses/0.01 m to 125 pulses/0.01 m, or between 20 pulses/0.01 m to 100 pulses/0.01 m, or between 30 pulses/0.01 m to 90 pulses/0.01 m.

As the injected lug material is injected it cools largely by conduction to the heat sink conveyor, and also as it moves away from the injector head in the machine direction it cools and solidifies. Thus the continuous solid lug strip 11 impregnated into the fibre material is formed along the length of the fibre material. The continuous lug strip may for example have a width in the range about 2 to about 150 mm. The lug strip may be formed along or near one or both opposite long (in the machine direction) edges of the fibre material and/or centrally in the fibre material, and the length of fibre material cut not only transversely into individual electrode segments but also lengthwise. The transverse/macro-scale current collector if also provided may for example have a width in the range about 2 to about 150 mm. By way of example, with respect to the temperatures of the fibre material, heat sink conveyor, and molten lug material, with the initial temperatures of the fibre material and band at 15 deg C., then superheating of the molten lug material, if it was Pb, may be to about 25 deg C. above the melting point of Pb, but could be up to 150 deg C. above the melting point.

In at least some embodiments the pressure of each pressure injection pulse is higher at or towards an end of the pulse than at or towards a start of each pulse. At each injector pulse the first lug material impregnating into the fibre material may begin to solidify and thus become less liquid, and if the latter portion of the lug material injected by the same pulse is pushed into the material with higher pressure it will aid in impregnating the lug material further into the fibre material.

Figure 5:
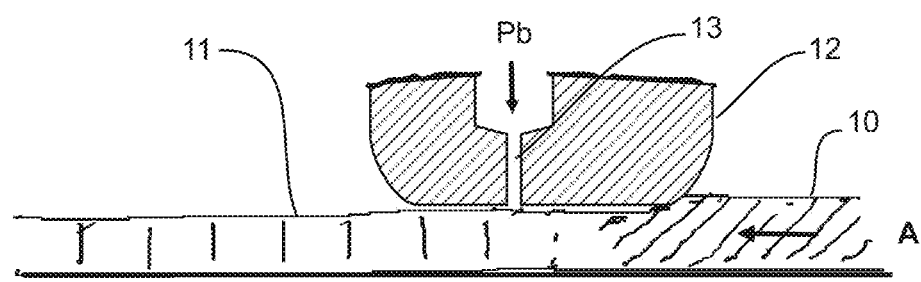
FIG. 5 is a schematic cross-section view of carbon fibre material passing beneath a pressure injection head.
Figure 6:
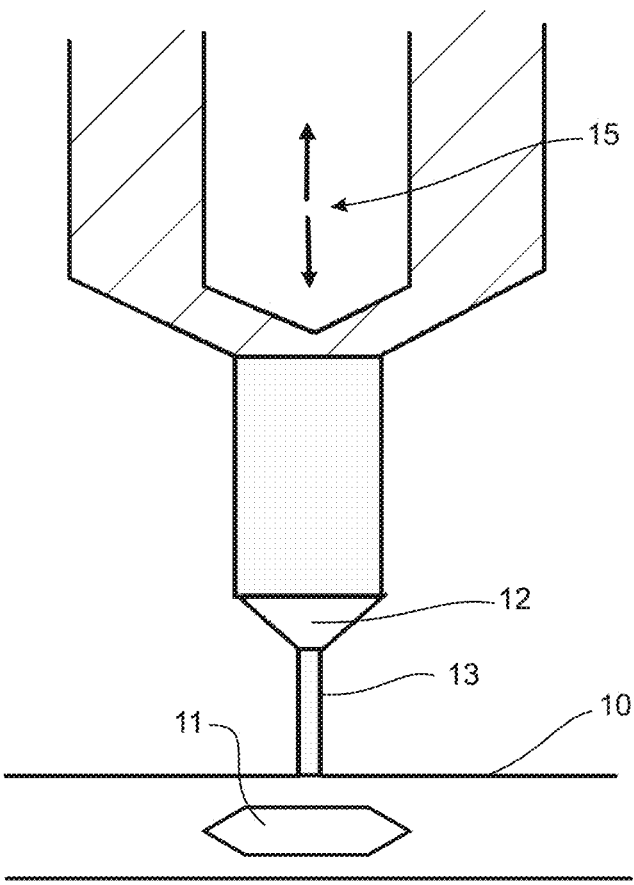
FIG. 6 is a schematic cross-section view of a pressure injection stage.

FIG. 5 is a schematic cross-section view of fibre material 10 passing beneath a pressure injection head 12 having an outlet orifice 13, and FIG. 6 is a larger schematic cross-section view of a pressure injection stage. Each orifice 13 may for example have an area to deliver less than or equal to 1 cm3 of molten material. The injector head may contact the surface of the fibre material 10 moving past it or even slightly compress it as shown, for example by about 10-20% of its free depth, or be spaced above by for example not more than 10 mm from the surface of the fibre material. Compression of the fibre material by the injector head may assist in limiting excessive spread of molten Pb across the top surface of the fibre material and instead assists the molten lead entering into the fibre material.

Figure 7:
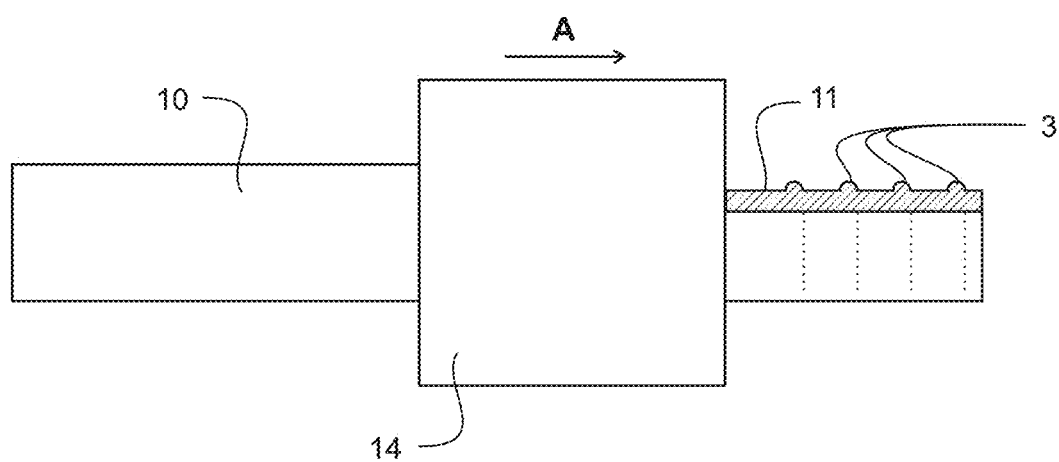
FIG. 7 is a schematic plan view of fibre material entering and exiting a pressure impregnation stage in an embodiment for forming a single lengthwise edge lug strip.
Figure 8:
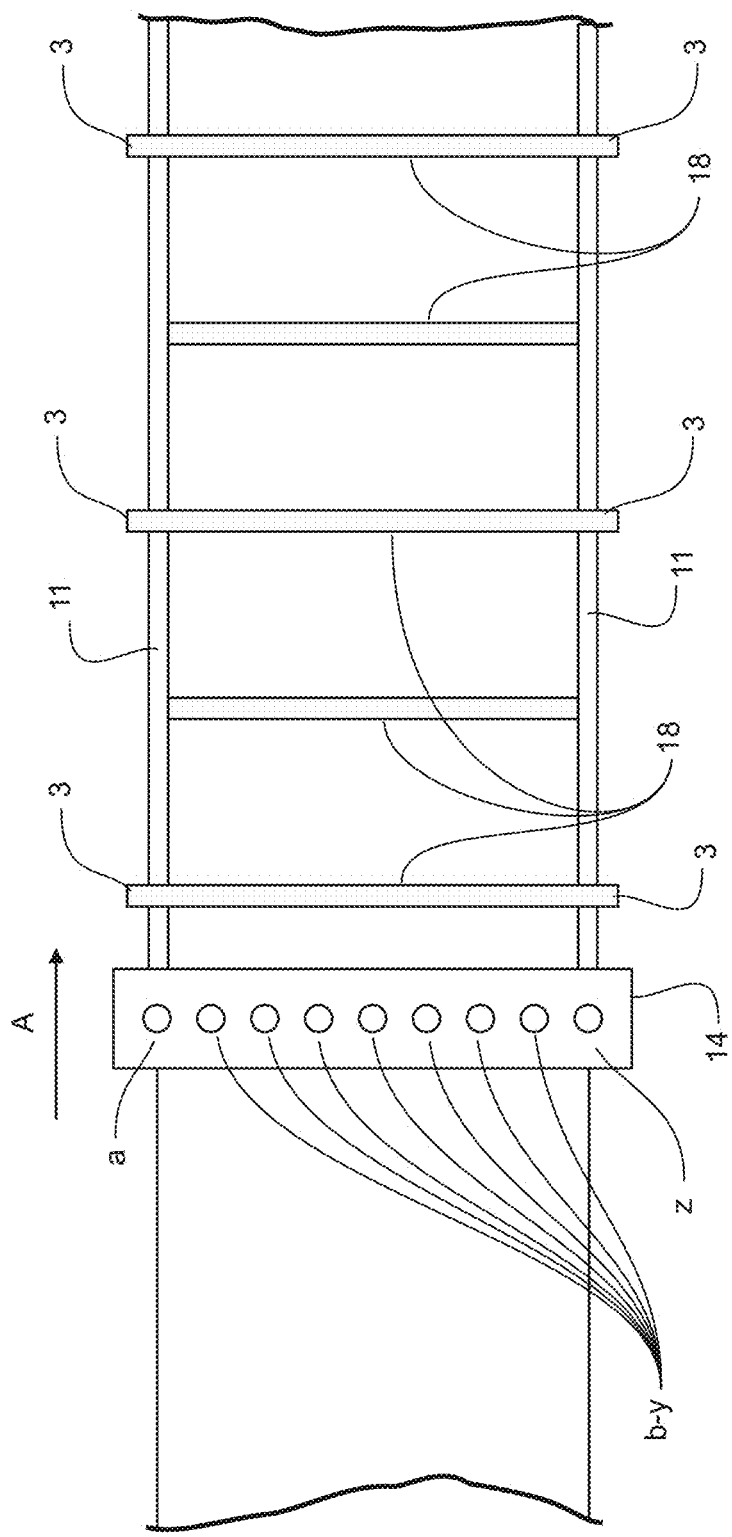
FIG. 8 is a schematic plan view of fibre material entering and exiting a pressure impregnation stage in another embodiment for forming lug strips along both lengthwise edges.

FIG. 7 is a schematic plan view of fibre material 10 entering and exiting a pressure impregnation stage 14 in one embodiment. FIG. 8 is a schematic plan view of fibre material 10 entering and exiting a pressure impregnation stage 14 in another embodiment. The fibre material moves in machine direction A. In the pressure impregnation stage 14 of the embodiment of FIG. 7 a continuous lug strip 11 is formed along one lengthwise edge of the fibre material, also with spaced lug extensions 3 beyond the edge of the fibre material. The broken lines across the fibre material and lug strip indicate where it will subsequently be cut to form individual electrode elements. In the pressure impregnation stage 14 of the embodiment of FIG. 8 continuous lug strips 11 are formed along both lengthwise edges of the fibre material, optionally also with spaced lug extensions 3 beyond both edges of the fibre material. Alternatively the lug extensions may be cut out by a separate cutting machine such as a stamping machine that is provided in line or separately to the lug forming machine. The lug strips may further undergo a trimming stage to remove any excess to form a desirable lug size and shape Any such trimmed lug material from the trimming and/or additional cutting stage to form the lug extensions, may be captured by a reticulation system that captures the removed trimmings and conveys the trimmings back into tank holding the molten metal to be reused.

Also in the embodiment of FIG. 8 the pressure injection stage forms lug strips 18 transversely across the fibre material between lug strips 11 along the lengthwise edges of the fibre material. In a variant of the embodiment of FIG. 7 such transverse lug strips 18 may extend from the edge lug strip along the lengthwise edge to the opposite edge of the fibre material, or part way across the width of the fibre material. Referring again to FIG. 8, the lug strips 11 along the lengthwise edges of the fibre material may be formed by outermost injection orifices of the injection stage 14 schematically indicated at a and z through which lug material is injected near continuously to form the edge lug strips 11, while the spaced transverse lug strips 18 may be formed by multiple injection orifices b-y between, through which lug material is injected only periodically as the fibre material moves beneath the injection stage. When in operation, all operate to inject lug material at the same time for the same duration, and the injection orifices b-y are spaced from each other, so that the lug material impregnated into the fibre material by each simultaneously, merges and solidifies to form a solid strip across the fibre material width.

FIG. 6 is a schematic cross-section view of a pressure impregnation stage. Similar reference numerals indicate the same parts as referred to above. Molten metal to be injected into the fibre material 10 through orifice 13 is forced under pressure through the orifice by a piston reciprocating within chamber 15. One piston stroke injecting a set volume of lug metal into the fibre material may comprise one 'pulse' of the injector. The injector system may be arranged to increase the injection pressure so that the injection pressure of the metal into the fibre is higher at or towards an end of the pulse than at or towards a start of each pulse. For the simple single valve mechanical system shown in FIG. 5, the closing of the valve takes an appreciable fraction of the cycle time, and the molten metal leaks back through the valve at a reducing rate until it is shut. Thus the available pressure in the space above the injector orifice due to the piston movement gradually increases to a maximum as the valve closes.

FIGS. 13 to 18 show an embodiment of a lug forming machine. In this embodiment the machine comprises side by side pressure injectors 201 and 202 to form a continuous lug along opposite lengthwise edges of the continuous fibre material as it passes through the machine. The injectors are mounted above a conveyor in the form of rotating drum 500, all carried by frame 203. The drum conveyor 500 has a width across an axis of rotation equal to or greater than the width across the machine direction of the fibre material so that the drum supports the full width of the fibre material.

Figure 16:
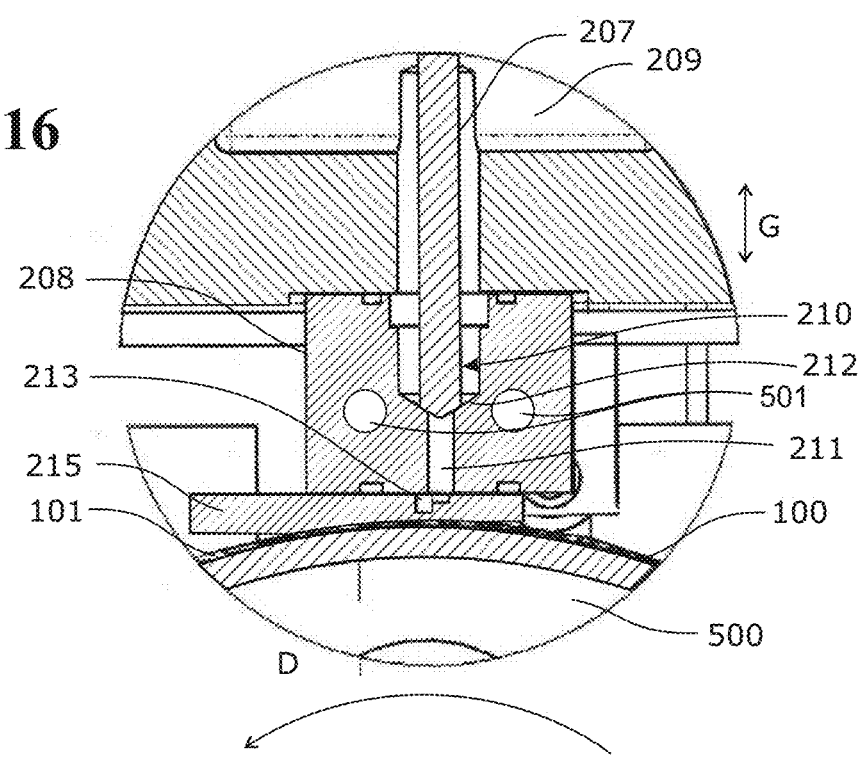
FIG. 16 is an enlarged schematic vertical cross-section view along line II-II of FIG. 13 of an injector head, enlarged to show operating parts in greater scale.
Figure 17:
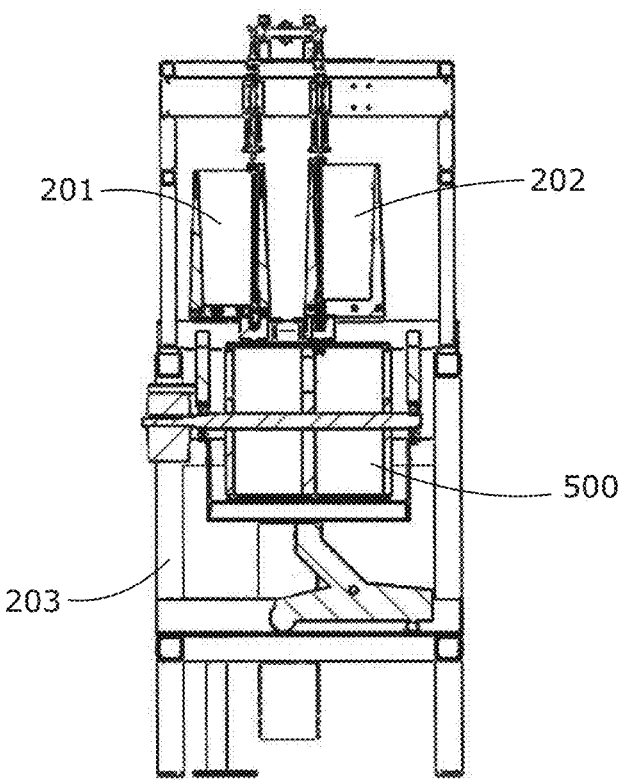
FIG. 17 is a side view of the lug forming machine along line III-III of FIG. 13.

In operation the fibre material passes through a gap between the rotating drum 500 and pressure injection heads 201 and 202, as pressure injection pulses from the injector heads 201 and 202 impregnate lug material into the fibre material along either edge to form a continuous lug along each edge. FIG. 16 is an enlarged schematic vertical cross-section view along line II-II of FIG. 13 and shows in close up a portion of fibre material 100 with a lug strip 101 being formed on it. The fibre material 100 moves during impregnation in the direction of arrow D beneath the injector head and is supported by the rotating drum which also acts as a heat sink conveyor to rapidly cool the molten Pb to cool it rapidly as it exits the gap.

Figure 18:
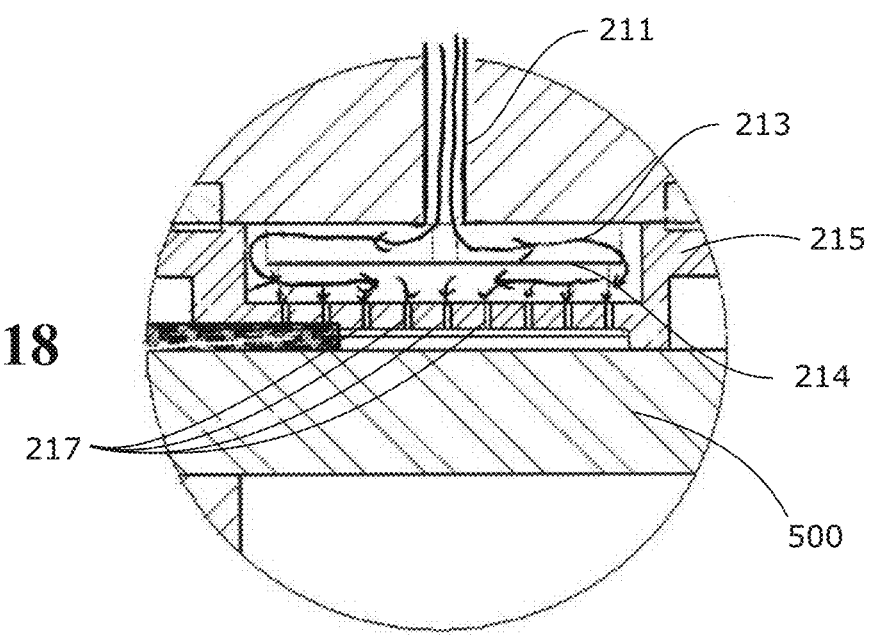
FIG. 18 is a schematic vertical cross-section view along line III-III of FIG. 13 of the injector head of FIG. 16, enlarged to show operating parts in greater scale.

Additionally, FIG. 16 shows the operating parts of injector 201/202 in greater scale. Injector piston 207 moves reciprocally in cylinder 210 in piston block 208 as indicated by arrow G and at each downward stroke pushes molten lug material from heated reservoir 209 which fills cylinder 210, through port 211 until piston 207 seats against valve seat 212 which then closes port 211. The lower surface of foot or injector head 215 is curved with a radius to match the drum 500 so that the fibre material is held in a gap between the injector head 215 and drum 500 and may be compressed slightly, such as for example to about 80% of free thickness of the fibre material, between the two as described. Heaters 501 may be provided in the block 208 to ensure that the block is maintained at a temperature that does not partially cool or freeze the molten material in the cylinder or port. Referring also to FIG. 18, molten lug material exits from port 211 into chamber 213 provided in injector head 215. The molten lug material flows around plate 214 provided to ensure an even distribution of the molten flow to all injector outlet orifices 217, and from outlet orifices 217 into part of the fibre material and into the void adjacent the fibre material to form both a composite zone of lead and fibre and a solid lead zone, that together form a lug zone. As the piston moves upwardly before the next downward stroke molten Pb refills the cylinder 210 from reservoir 209, before the piston moves downwardly at the next injection pulse. Molten Pb exiting the orifices 217 impregnates the fibre material and the adjacent void passing beneath the injector 202, and rapidly cools to form the continuous lug as the material exits the space between the drum 500 and the injector head 201. The system requires temperature control of the block 208 and injector head 215 and the drum 500 to ensure the molten lead flow freezes or solidifies sufficiently quickly downstream from the injection/casting point so as to create a barrier to the upstream molten lead, but does not freeze too quickly so as to result in blockages underneath the injection/casting point.

Figure 19:
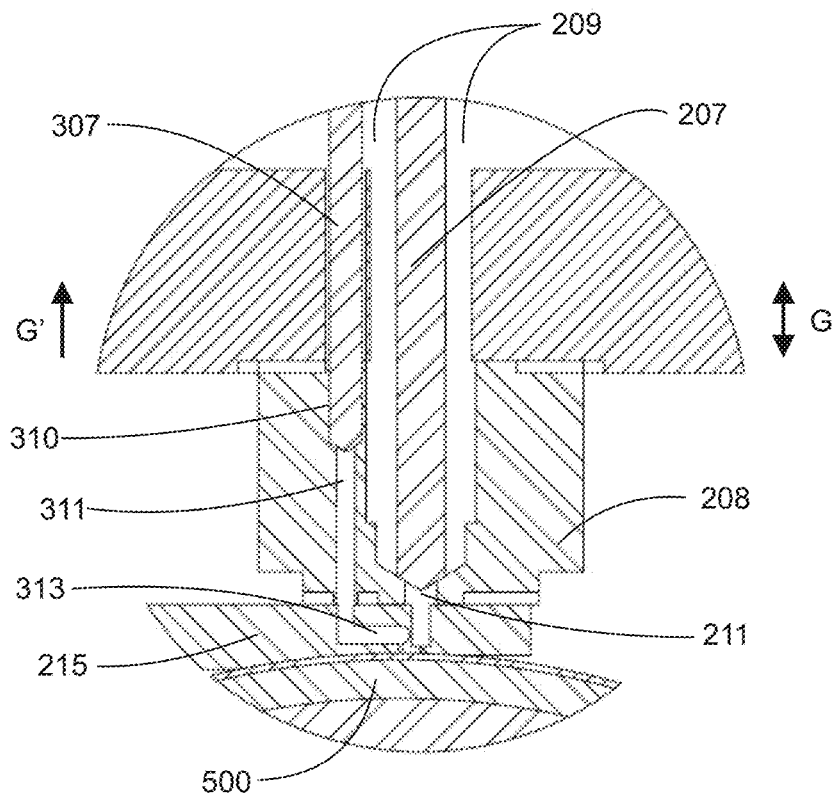
FIG. 19 is an enlarged schematic vertical cross-section view similar to that of FIG. 16 but of an alternative embodiment of an injector head.
Figure 20:
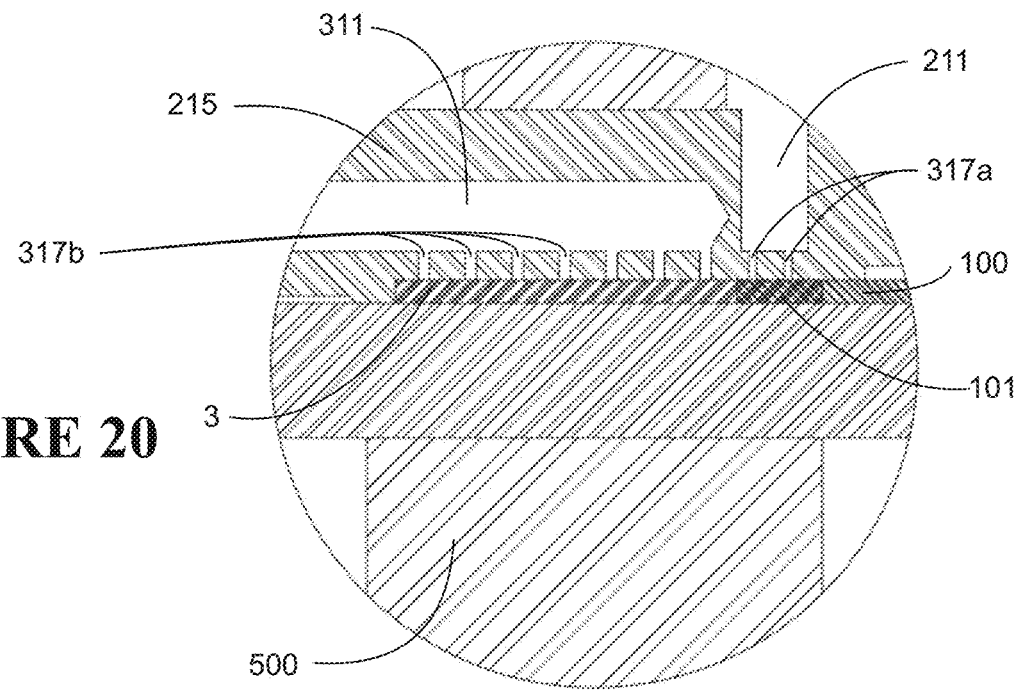
FIG. 20 is an enlarged schematic vertical cross-section view similar to that of FIG. 18 but further enlarged, of the alternative embodiment injector head of FIG. 19 of injector 201/202.

FIG. 19 is similar to FIG. 16 and FIG. 20 is similar to FIG. 18 but further enlarged, and FIGS. 19 and 20 show the operating parts of an alternative embodiment of injector 201/202. Unless indicated otherwise the same reference numerals in FIGS. 19 and 20 indicate the same parts as in FIGS. 16 and 18, which operate in the same way. A difference is that whereas in the embodiment of FIGS. 16 and 18 a single injector piston 207 moving reciprocally in cylinder 210 at each downward stroke pushes molten lug material through injector head 215 to form both a composite zone 101 of lead and fibre and a solid lead zone, in the dual flow embodiment of FIGS. 19 and 20 the piston 207 pushes (relatively higher pressure) pulses of molten lug material through injector head 215 to form the composite zone of lead and fibre and a valve 307 simultaneously meters a continuous flow of lower pressure molten lug material through injector head 215 to form the solid lead zone. The valve 307 moves in chamber 310, in the same piston block 208, and opens in the direction of arrow G' to allow a lower pressure flow of molten lug material from heated reservoir same 209, through port 311 into chamber 313 provided in the injector head 215 and then from outlet orifices 317*b* into the void adjacent the fibre material 100 to form a solid lead zone, at the same time that molten lug material driven by reciprocating piston 207 through port 211 flows from outlet orifices 317a into part of the fibre material to form an adjacent composite zone of lead and fibre (instead of through orifices 217 in the embodiment of FIGS. 16 and 18). Molten material exiting the orifices 317a impregnates the fibre material and molten material exiting the orifices 317b fills the adjacent void, and the molten material rapidly cools as the material exits the space between the drum 500 and the injector head, to form the continuous lug and lug extension along the edge of the fibre material. We have that where the molten material is lead it may be advantageous to reduce possible blocking of the injector orifices that the lead comprises a minor proportion of Sn, so that the molten material comprises a Pb—Sn alloy. The low and high pressure flows are synchronized with the travel speed of the fibre material to simultaneously deliver the correct volumes of lead into the edge region 101 of the fibre material and the adjacent void to form the solid lug extension. This embodiment comprises a first pressure injector arranged to impregnate the lug material into a lug zone part of the fibre material and a second adjacent pressure injector arranged to deliver the lug material into an adjacent void to form the solid lug extension adjacent the lug zone part of the fibre material.

The lug forming machine may comprise a fibre material feed system which draws the fibre material through the lug forming machine, which comprises drivers specifically optional nip rollers 221 past the exit side of the rotating drum in the machine direction which contact opposite faces of the continuous lengthwise lug just formed on the fibre material on either side.

In yet alternative embodiments arranged to form a lug along the edge of the fibre material and also a solid lug extension continuously along or at spaced intervals along the edge of the lug, after the edge of the fibre material has been impregnated as described above, separately formed lug extension(s) may be attached to the lug by for example ultrasonic welding or soldering together.

The embodiments above have been described above in relation to forming an electrical connection to a fibre material electrode element. The fibre material of the electrode element may be electrically conductive as would be required for a negative or positive electrode in a Pb acid battery for example, or may be non-conductive, for a positive electrode in a Pb acid battery in some cases for example. For example a positive electrode may be formed of polyacrylonitrile fibre material (PAN) which has been oxidised to become oxidised PAN fibre (OPF) that has not then undergone carbonisation which would render it electrically conductive. The invention may also be used for forming an electrical connection to a fibre material which is not an electrode element, or even more generally for impregnating a first material which is not also electrically conductive, into a fibre material not for forming an electrical connection to the fibre material but instead for other industrial purposes, such as for strengthening and/or building purposes.

Battery or cell construction A lug formed on fibre material electrode as described above may also comprise a transverse/macro-scale current collector as described previously (for example see at 52 in FIG. 1) formed in the same way as the lug ie by pressure impregnation into the fibre material as described. Such a transverse/macro-scale current collector may extend from the lug zone at any angle to the lug zone across and to any location within the electrode zone, to provide an additional macro scale current collecting pathway from the carbon fibre to the metal lug, in addition to the micro-scale pathways through the carbon fibre material itself of the lug. While we refer to such a transverse/macro-scale current collector as such it may also be considered a part of the lug, which lug part passes/is impregnated across the material rather than only along an edge or edges. Alternatively or additionally a lug formed on a fibre material electrode as described above may also comprise on one or both sides of the fibre material a metal wire or tape electrically conductively attached to the electrode material and to the lug, to provide an additional transverse/macro-scale current collecting pathway from the carbon fibre to the metal lug, in addition to the micro-scale pathways through the carbon fibre material itself of the lug. The metal wire or tape may be attached to the fibre material for example by stitching or sewing with a thread that will not dissolve in battery electrolyte, or other inert Pb acid battery binding material that will hold the current collector in place, such as a resin, cement or potting mix. The metal wire or tape may be pressed into the fibre material during manufacture. Alternatively the wire or tape or similar may be soldered to or printed on the fibre material. The metal wire or tape(s) may be arranged in a sinuous shape on one or both sides of the fibre material, extending continuously between the lug at one edge of the electrode, at which edge the wire or tape is conductively connected to the lug by being embedded in the lug, and at or towards another spaced edge of the electrode. Alternatively the wire or tape may extend between metal lugs along opposite edges of the electrode or a frame around the electrode. Alternatively again separate lengths of the wire or tape may extend from the lug at one edge to or towards another edge of the electrode, or alternatively again the wire or tape macro-conductor as described may comprise a metal mesh attached on one or both sides of the fibre material. The ends of the wire or tape or mesh may terminate and be embedded in the lug. It is important that when the current collector is on the outer surface of the electrode that acts as the negative electrode the current collector is protected from anodic oxidation from the positive electrode. Preferably the wire or tape runs up and down the length of the electrode with equal spacing across the width of the electrode without any cross over points, to prevent local hotspots occurring or heat build up in particular areas, and an even current collection across the electrode. Preferably the volume of the wire or tape or mesh or similar transverse/macro-scale current collecting system is less than about 15% of the volume of the electrode (excluding the lug or surrounding metal frame or similar).

Typically during battery or cell construction the fibre material is impregnated with a paste, which in a preferred form comprises a mixture of Pb and PbO particles of Pb and PbO and a fluid. In some embodiments the fluid is water, an acid or an alcohol. Preferably the acid is dilute sulfuric acid. Preferably the alcohol is ethanol. Alternatively the paste may comprise lead sulphate ($PbSO_4$) particles and dilute sulphuric acid. In some embodiments the paste at impregnation into the electrode comprises dilute sulphuric acid comprising between greater than 0% and about 6%, or between 0.25% and about 5%, or between 0.25% and about 4.5%, or between 1% and about 4%, or between 1% and about 3.5%, or between 0% and about 2%, or between 0.5 and 2.5% by weight of the paste of sulphuric acid. The Pb-based particles may comprise milled or chemically formed particles which may have a mean size of 10 microns or less, small enough to fit easily into spaces between the fibres. The paste or active material may fill the carbon fibre electrode up to the lug so that the active material contacts or abuts the lug where the fibre enters the lug and electrically connects direct to the lug, not only at the surface of the fibre material on either side but also through the thickness of the fibre material, and along a major part of or substantially all the length of the boundary between the lug material and the non-lug material impregnated fibre material at this boundary, or may stop short of the lug so that there is a small gap between the paste and the lug such as a gap of up to about 5 mm for example. In a preferred embodiment the lug is formed so as to have protrusions of the lug such as Pb protrusions, into the active material impregnated into the carbon fibre material, as described above.

As stated preferably the surface to volume ratio of Pb particles in the active material is at least about 3 times greater, or preferably about 5 times greater, or preferably about 10 times greater, or preferably about 20 times greater, than a surface to volume ratio of lug material in the lug zone. Preferably the surface to volume ratio of Pb particles in the active material is greater than about 2 $m^2/cm^3$ or greater than about 1 $m^2/cm^3$ and the surface to volume ratio of lug material in the lug zone is less than about 0.05 $m^2/cm^3$. The surface associated with molten lug material that has been injected into fibre layers, cooling as it enters, is likely to be similar to the surface area of the fibres that it will cool around, or less. For example, a carbon felt may have an area of the cylindrical surfaces of the fibres equal to around 20 $m^2$ per mm thickness for 1 $m^2$ of superficial area, which is equivalent to 0.02 $m^2$ per $cm^3$ of felt total volume. Thus flowing molten lead around this fibre network will form (by freezing onto the cold fibres first) a lead structure with branches larger in diameter than the diameter of the fibres ie. the diameter of the branches of this lead-loaded felt may increase from 10 microns to around 15 to 20 microns with surface area perhaps 0.01 $m^2$ per $cm^3$ (for higher volume fraction impregnation these branches will merge and the surface will decrease even further). These surface areas can be compared with those for the normal active material within a negative electrode in a lead-acid cell. Lead-containing active mass is divided into a lead skeleton that carries current (which is not susceptible to electrochemical change during charge and discharge cycles) and a much finer mass that is susceptible to change and in fact produces the working electrical currents of the battery. The much finer "energetic active material" may have around 0.3 micron diameter branches. The skeleton may be very similar to the branches formed by partial impregnation above, with negligible electrochemical attack. However the surface area of the fine electrochemically active material may have $(20)/0.3)=70$ times the surface area per unit volume of lead, and so suffers almost all the chemical attack. The division between fine material and coarse skeleton material is around 50/50% in most negative electrodes.

General

In a battery typically a lead-acid battery, the positive electrode or electrodes, the negative electrode or electrodes, or both, may be formed with a lug in accordance with the method(s) of the invention. Preferably the current collector material and the fibres thereof are flexible, which will assist in accommodating volume changes of the active material attached to the current collector material during battery cycling, and the microscale fibres may also reinforce the active material, both assisting to reduce breaking off ("shedding") of active material from the electrode in use.

In preferred embodiments the electrode fibres may be inherently conductive without requiring coating with a more conductive material such as a metal to increase conductivity, and may be carbon fibres which may in some embodiments be treated to increase conductivity. In other embodiments the electrode fibres may be a less conductive material, the fibres of which are coated with a conductive or more conductive coating. In some embodiments the fibres of the current collector material may be coated with Pb or a Pb-based material. For example the negative electrode or electrodes may be coated with Pb and the positive electrode(s) coated with Pb and then thereon $PbO_2$.

The current collector material may be a woven material, a knitted material, or a non-woven material, such as a felt, or a fluid hydro-entangled material. The material may comprise filaments extending in a major plane of the material with each filament composed of multiple fibres, with optionally connecting threads extending transversely across the filaments to mechanically connect the filaments. The average depth of the material may be at least 0.2 millimetres or at least 1 millimetre. At least a majority of the fibres have a mean fibre diameter of less than about 20 microns, or less than about 10 microns.

In some embodiments the fibre material may be carbon fibre material which has been thermally treated at an elevated temperature, for example in the range 1000 to 4000° C. In some embodiments the fibre material may be carbon fibre material which has been treated by electric arc discharge. The carbon fibre material may be electric arc treated by moving the carbon fibre material within a reaction chamber either through an electric arc in a gap between electrodes including multiple adjacent electrodes on one side of the material, or past multiple adjacent electrodes so that an electric arc exists between each of the electrodes and the material.

In some embodiments the fibre material may be carbon fibre material, such as PAN fibre, that has then been oxidised at temperatures from between 250 to 600° C. to provide OPF that is not electrically conductive. Such fibre materials can be used as an electrode element.

In some embodiments the fibre material may be felt or other non-woven planar electrode material produced to very low thickness such as for example 2.5 mm or less thickness by dividing thicker material in plane. That is, the material may be cut in its plane one or more times to divide a thicker non-woven material into multiple sheets of similar length and width but reduces thickness to the starting sheet.

EXPERIMENTAL

Examples 1 and 2

A layer of carbon felt supported on a steel band was fed beneath a stationary steel head that had one or more vertical holes drilled through it. Molten lead was held above these holes and could pass through them to the felt as it passed beneath, as shown in FIGS. 3 to 5. 3 L of lead was heated in a cylindrical container so that the lead temperature could be held to within 1 deg C. of a desired temperature above the lead melting temperature. A valve was situated between the pool of lead and the holes, and could be opened and shut to allow short pulses of lead to pass through them (see FIG. 4 for the case of one hole). The head of this valve contacted a matching seat to close off the flow, and could be raised and lowered from the top of the apparatus through axial movements of a stem that passed through the lead pool. The stem was kept central to the valve by three bearings along its length and was attached at its top to a reversing mechanism that allowed the valve to open briefly once in every rotation of the mechanism. The frequency of the mechanism could be adjusted, as also could the duration of the opening. The mechanism was powered by a machine that had a maximum frequency of a push-pull cycle of around 50 Hz. The top of the stem was held down by a compression spring but was lifted to open the valve towards the top of the movement of the machine, at a position that could be adjusted by a single spacer threaded in opposite directions at its two ends.

Example 1

Figure 9A:
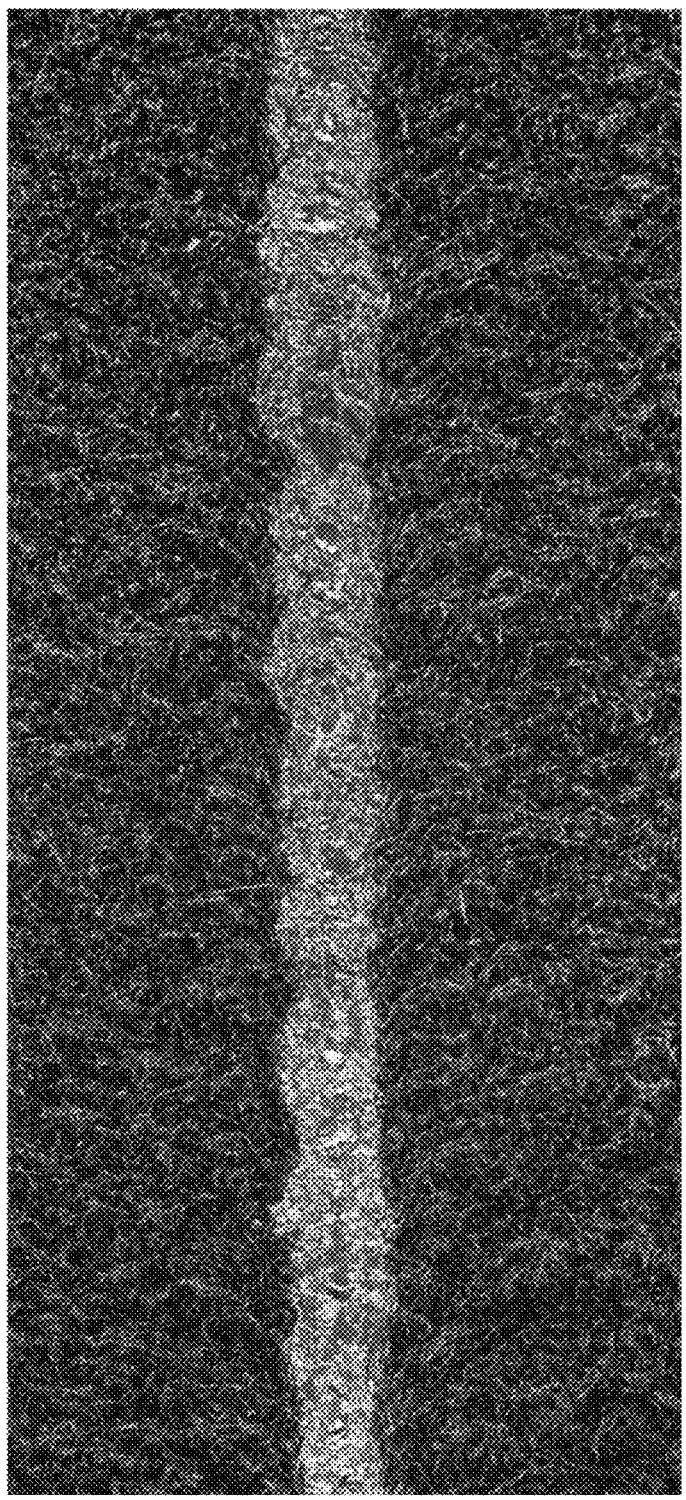
FIGS. 9A and 9B are images of the top side and underside of a section of carbon fibre felt with a Pb lug strip formed therein as described in the experimental examples.
Figure 9B:
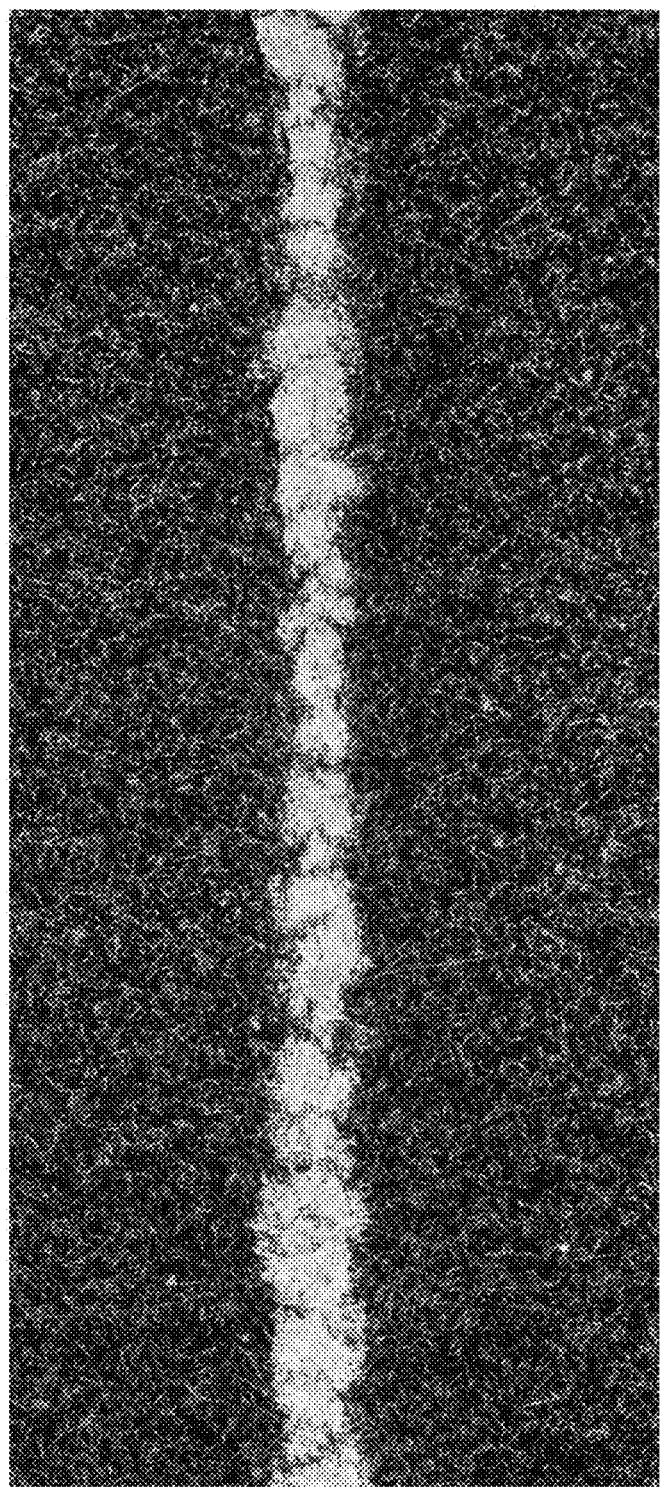

A simple single orifice of diameter 0.5 mm was used, injecting into a 2.5 mm thick layer of arc-treated felt with a volume fraction of carbon of 4.2% (mass of carbon per unit area 180 g/m2). The reversing mechanism, in this case a jig-saw, was operated at 50 Hz, so that 50 short pulses of lead penetrated the felt each second. The felt was advanced at the rate of 40 mm/s and was compressed by the head as it was passed under. The thickness of the lead composite formed by the injection was 1.3 mm. FIGS. 9A and 9B are images of the top side and underside of a section of the carbon fibre felt with the Pb lug strip formed therein. They show the path of the lead infiltration across the felt, first (a) viewed from the side of the orifice and second (b) viewed from the underside. The felt was carried on a steel belt that was at room temperature before the lead was injected into the felt above it. The belt thus cooled the felt from the underside. It can be seen from the figures that the lead penetrated the felt throughout the visible extent of the path, with the successive pulses joining together.

Example 2

Figure 10A:
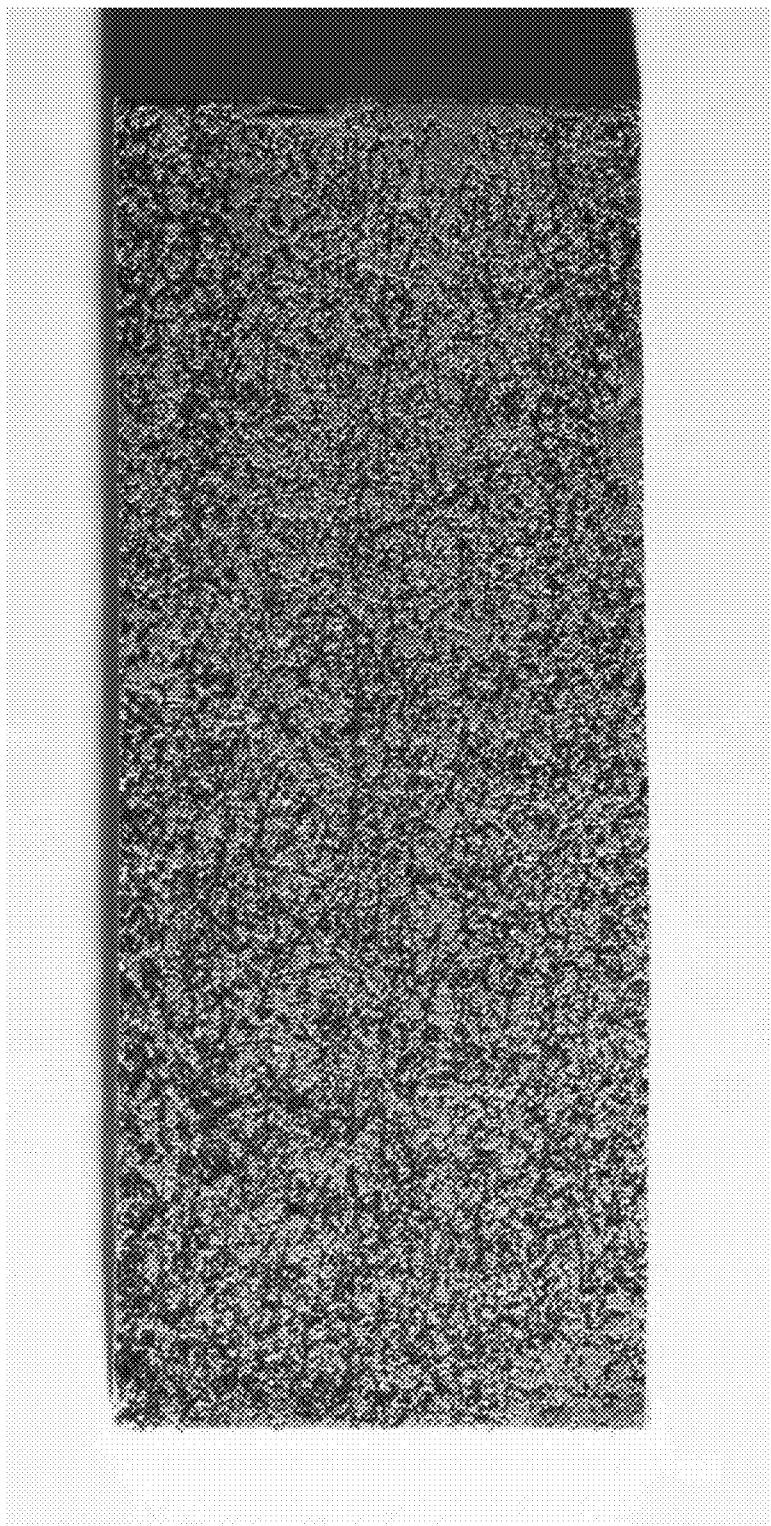
FIGS. 10A and 10B are images of the underside and top side of part of a Pb lug strip (alone) formed on a carbon fibre felt as described in the experimental examples.
Figure 10B:
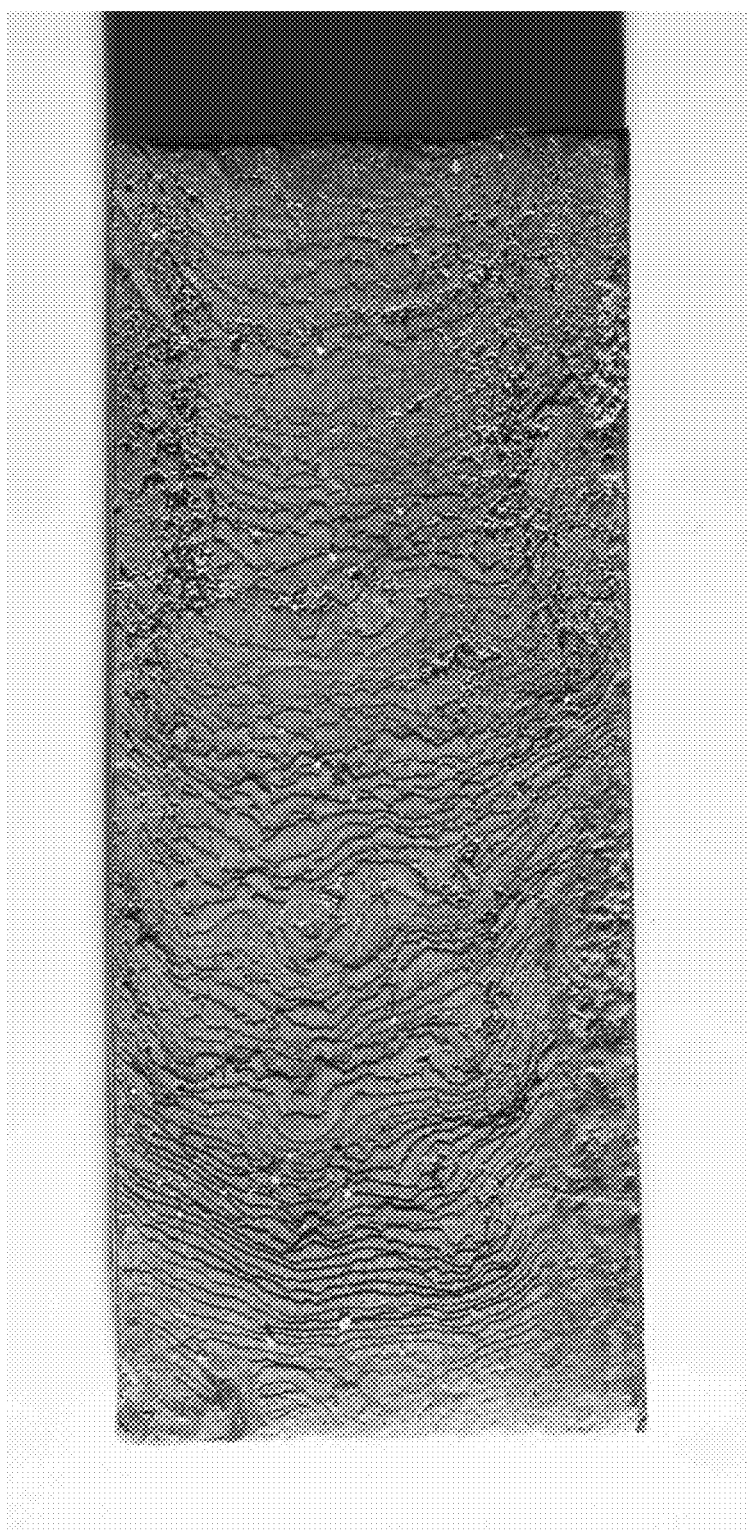
Figure 11:
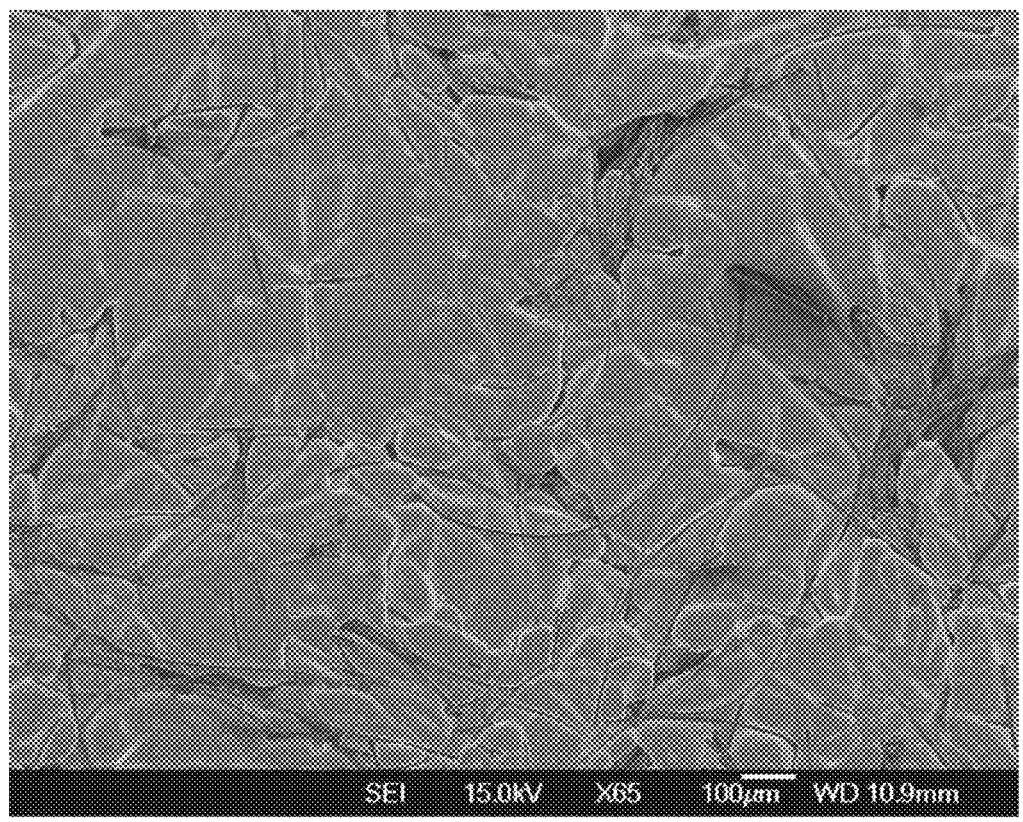
FIG. 11 is an SEM image of the underside of part of a Pb lug strip formed on a carbon fibre felt.

This example illustrates the use of multiple injection ports. 3 holes were made in the head each of diameter 0.5 mm, allowing lead pulsed flows from each hole. The feed rate of the felt was 40 mm/s and the repetition rate of pulses was 50 Hz. Under these conditions the injection from all holes also joined well with those next to them, making a wider injection, about 20 mm wide under the condition used, with thickness 1.3 mm. Cutting out a small area of the path and measuring the dimensions and mass allowed one to calculate the voidage, by subtracting both the volume of the carbon (estimated from the known volume per $m^2$) and the volume of the lead (estimated from the mass of lead and the density of lead). FIGS. 10A and 10B are images of the underside and top side of part of the Pb lug strip. The voidage of this sample was 12±2%. In the FIG. 10B top surface image shallow contours are spaced a little shorter than 1 mm apart, indicating where successive injections have come together (expected spacing 40/50=0.8 mm). The top of the sample is clear of carbon. A thin cover of carbon remains on the top of the track after infiltration, but is easily removed e.g. by light scratching. It appears that any loose small pieces of carbon within the felt rise to the top during infiltration and this is what is observed before the samples are handled. FIG. 11 is an SEM image of the underside of part of a Pb lug strip formed on a carbon fibre felt from which it can be seen that Pb has impregnated fully through the carbon fibre material.

The driving force for the pulse flow was initially thought to be provided partly from the static head of the lead at the orifice. No pressure was applied above the pool of lead in the above examples, so this static head was that of 300 mm height of lead, i.e. 33 kPa. However when the valve was left open without pulsing the valve, the penetration of lead into the felt was negligible. Also no extra flow into the felt was observed when the opened period of the valve was increased beyond about 10% of a full cycle. Thus under these static head conditions, the significant effective infiltrating pressure appeared to be from the pumping action of the valve head. An analysis of the fluid flow during valve motion was then made. From this analysis the downward movement of the head towards closing increased the pressure above the orifice. Taking account of back leakage through the closing annular sealing portion of the valve (see FIG. 6), and using a turbulent pressure drop across both the injection orifice and annular sealing area (of one kinetic head), one can estimate the profile of pressure and injection velocity during the closing portion. This model shows that pressures of tens of bar were generated towards the end of each pulse. This generated pressure is dropped over both the injector orifice and the rapidly filling felt. It is expected that a significant fraction of the total pressure drop to atmosphere is across the partly filled felt and therefore this high pressure is effective in adequately filling the felt and achieving a small remaining voidage.

Figure 12A:
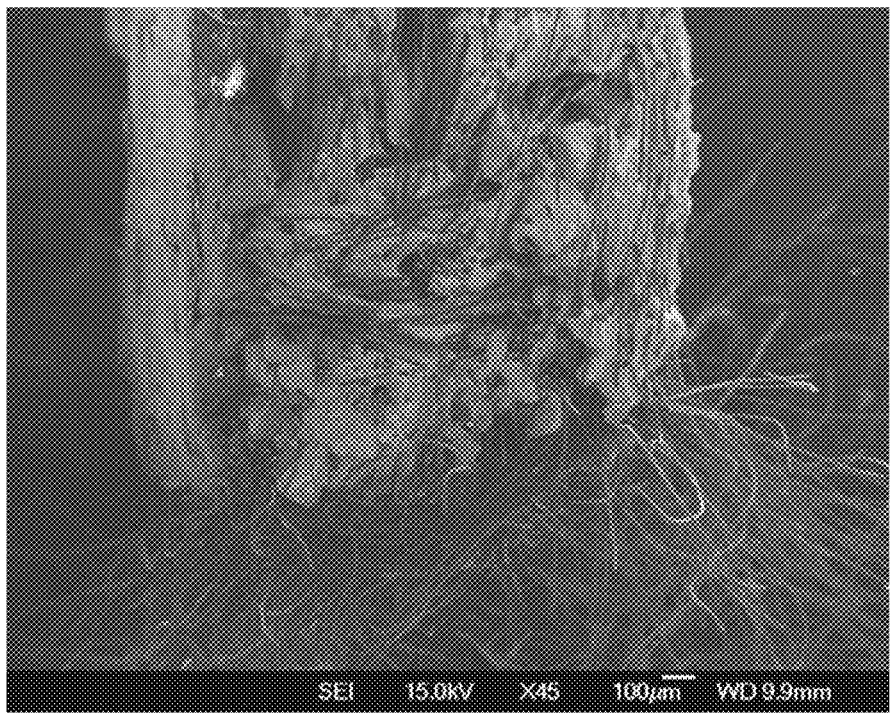
FIG. 12A is an SEM image of a cut through the Pb lug strip (alone) formed on carbon fibre felt.
Figure 12B:
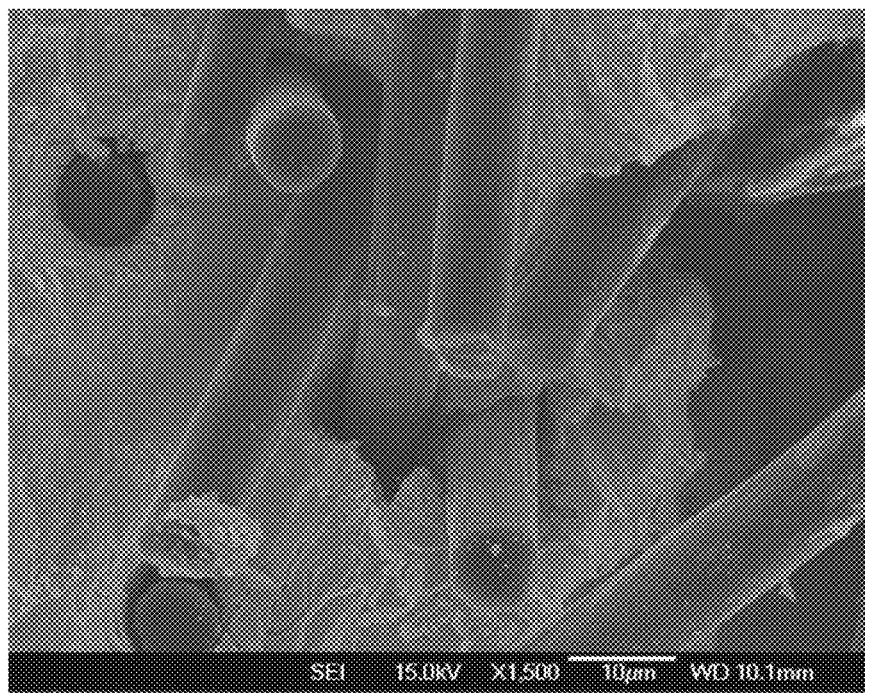
FIG. 12B is a higher magnification SEM image than FIG. 12A showing Pb impregnating around and between individual fibres with low voidage.
Figure 13:
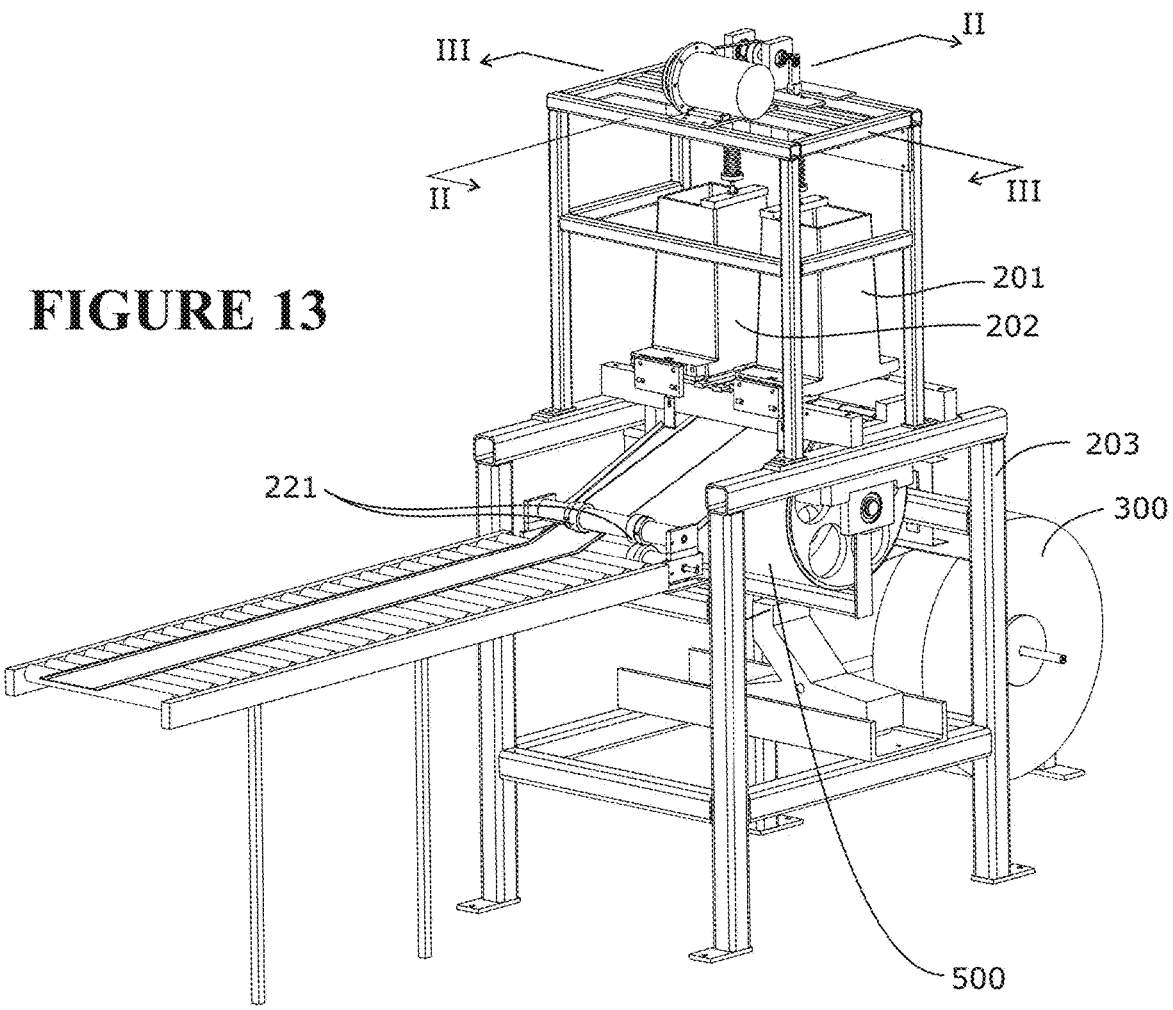
FIG. 13 is a perspective view of an embodiment of a lug forming machine.
Figure 14:
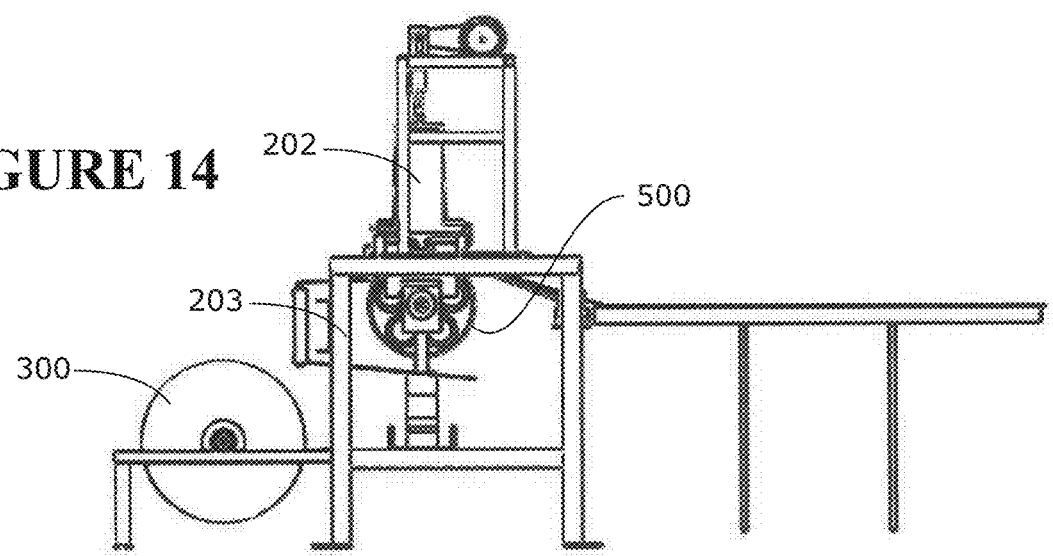
FIG. 14 is a side view of the lug forming machine of FIG. 13.
Figure 15:
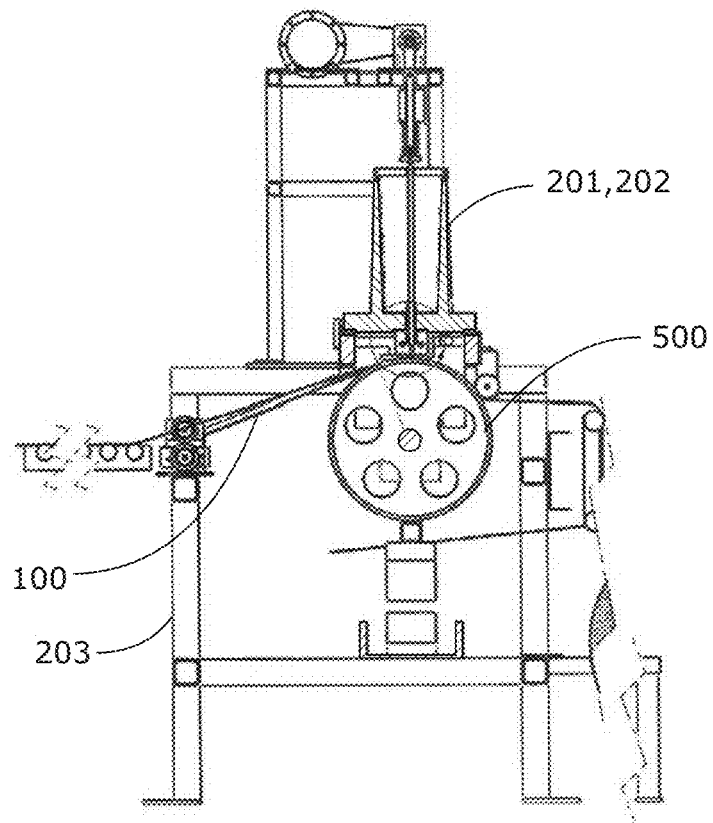
FIG. 15 is a schematic vertical cross-section view of the lug forming machine along line II-II of FIG. 13.

FIG. 12A is an SEM image of a cut through the Pb lug strip (alone) formed on carbon fibre felt and FIG. 12B is a higher magnification SEM image than FIG. 12A, from which it can be seen that Pb has impregnated around and between individual fibres. This shows a low voidage.

The foregoing describes the invention including preferred forms thereof and alterations and modifications as will be obvious to one skilled in the art are intended to be incorporated in the scope thereof as defined.

The invention claimed is:

1. A method for forming a connection to a fibre material electrode element comprising a fibre material, which comprises:
    moving a length of the fibre material continuously or in a stepped movement relative to a pressure injection stage or vice versa; and
    by the pressure injection stage pressure impregnating by a series of pressure injection pulses an electrically conductive lug material into a lug zone part of the fibre material during the relative movement between the fibre material and pressure injection stage so that multiple pressure injection pulses inject lug material into different adjacent portions of the fibre material, to surround and/or penetrate fibres of the fibre material and so that the molten lug material impregnating into the fibre material from each new injector pulse merges while molten with the lug material in the fibre material injected at the prior injector pulse to form a continuous lug strip along the lug zone part of the fibre material, said lug zone part of the fibre material having a width transverse to a length of the fibre material less than a greater width of the fibre material.

2. A method according to claim 1, which comprises carrying out said moving a length of the fibre material and said impregnating, to form a continuous lug strip along the lug zone part of the fibre material, without containing the lug zone part of the fibre material in a die.

3. A method according to claim 1 including moving the fibre material relative to the pressure injection stage or vice versa by carrying the fibre material on a heat sink conveyor.

4. A method according to claim 1 including controlling the speed at which the fibre material moves, the volume of molten lug material injected at each injector pulse, the duration and frequency of the injector pulses, and the temperature of at least the molten lug material, so that the molten lug material impregnating into the fibre material from each new injector pulse merges while molten with the lug material in the fibre material injected at the prior injector pulse to form a continuous lug strip.

5. A method according to claim 1 including compressing the fibre material to limit spread of molten lug material across a surface of the fibre material.

6. A method according to claim 1 including subsequently cutting the length of the fibre material across the lug strip to form multiple individual electrode elements each with a lug for external connection of the electrode element.

7. A method according to claim 1 wherein the fibre material has an average interfibre spacing less than about 200 microns.

8. A method according to claim 1 including forming a lug extension beyond an edge of the fibre material.

9. A method according to claim 1 wherein the fibre material is a carbon fibre material.

10. A method according to claim 9 wherein the fibre material comprises an electrically non-conductive polyacrylonitrile fibre material.

11. A method according to claim 1 wherein the lug material is Pb or a Pb alloy, Zn or a Zn alloy, or Cd or a Cd alloy, Al or Al alloy.

12. A method for forming a connection to a fibre material electrode element comprising a fibre material, which comprises:
  moving a length of the fibre material continuously or in a stepped movement relative to a pressure injection stage or vice versa;
  compressing the fibre material in the pressure injection stage; and
  by the pressure injection stage pressure impregnating by a series of pressure injection pulses an electrically conductive lug material into a lug zone part of the fibre material during the relative movement between the fibre material and pressure injection stage, said compressing of the fibre material in the pressure injection stage to limiting spread of molten lug material across a surface of the fibre material, so that multiple pressure injection pulses inject lug material into different adjacent portions of the fibre material, to surround and/or penetrate fibres of the fibre material and so that the molten lug material impregnating into the fibre material from each new injector pulse merges while molten with the lug material in the fibre material injected at the prior injector pulse to form a continuous lug strip along the lug zone part of the fibre material, said lug zone part of the fibre material having a width transverse to a length of the fibre material less than a greater width of the fibre material.

* * * * *